US012508881B2

(12) United States Patent
Laux

(10) Patent No.: US 12,508,881 B2
(45) Date of Patent: Dec. 30, 2025

(54) FILTER DEVICE OF A MOTOR VEHICLE AND METHOD FOR OPERATING SAME

(71) Applicant: MAHLE International GmbH, Stuttgart (DE)

(72) Inventor: Holger Laux, Dietingen (DE)

(73) Assignee: Mahle International GmbH (DE)

( * ) Notice: Subject to any disclaimer, the term of this patent is extended or adjusted under 35 U.S.C. 154(b) by 401 days.

(21) Appl. No.: 18/095,519

(22) Filed: Jan. 10, 2023

(65) Prior Publication Data

US 2023/0219027 A1 Jul. 13, 2023

(30) Foreign Application Priority Data

Jan. 11, 2022 (DE) ..................... 10 2022 200 201.6

(51) Int. Cl.
*B60H 3/06* (2006.01)
*B01D 46/00* (2022.01)
(Continued)

(52) U.S. Cl.
CPC ....... *B60H 3/0625* (2013.01); *B01D 46/0041* (2013.01); *B01D 46/442* (2013.01); *B01D 46/62* (2022.01); *B60H 1/00021* (2013.01); *B60H 3/0608* (2013.01); *B01D 2273/10* (2013.01); *B01D 2273/16* (2013.01); *B01D 2273/30* (2013.01); *B01D 2279/50* (2013.01); *B60H 2001/00085* (2013.01); *B60H 1/00849* (2013.01)

(58) Field of Classification Search
None
See application file for complete search history.

(56) References Cited

U.S. PATENT DOCUMENTS 10,059,171 B2 8/2018 Gesell
2020/0114724 A1* 4/2020 Chauvel ............. B60H 1/00457
2020/0376934 A1* 12/2020 Mazzocco ............ B60H 3/0625

FOREIGN PATENT DOCUMENTS

CN 104185563 A 12/2014
CN 204709968 U 10/2015
(Continued)

OTHER PUBLICATIONS

DE3912013A1_Eng (Espacenet machine translation of Andersen) (Year: 1990).*

(Continued)

*Primary Examiner* — Gabriel E Gitman
(74) *Attorney, Agent, or Firm* — Fishman Stewart PLLC

(57) ABSTRACT

A filter device of a motor vehicle may include a step filter, two flow paths, and a plurality of adjustable air flaps. The step filter may include a plurality of individual filter elements arranged fluidically in series. A first flow path may extend through at least two individual filter elements. A second flow path may extend through a number of the plurality of individual filter elements which, compared to a number of the plurality of individual filter elements through which the first flow path extends, may be reduced by at least one single individual filter element. The plurality of adjustable air flaps may be arranged at least one of upstream and downstream of the step filter. At least one air stream may be guidable through the step filter along at least one of the first flow path and the second flow path via the plurality of adjustable air flaps.

20 Claims, 3 Drawing Sheets

(51) Int. Cl.

| | |
|---|---|
| ***B01D 46/44*** | (2006.01) |
| ***B01D 46/62*** | (2022.01) |
| ***B60H 1/00*** | (2006.01) |

(56) References Cited

FOREIGN PATENT DOCUMENTS

| | | | | |
|---|---|---|---|---|
| DE | 3912013 | A1 * | 10/1990 | ......... B60H 1/00471 |
| DE | 19546550 | A1 | 6/1997 | |
| DE | 10117132 | C1 | 5/2002 | |
| DE | 102008042856 | A1 | 4/2010 | |
| FR | 3062604 | A1 | 8/2018 | |

OTHER PUBLICATIONS

English abstract for FR-3062604, Dated Aug. 10, 2018.
English abstract for DE-102008042856, Dated Apr. 22, 2010.
English abstract for DE-19546550, Dated Jun. 19, 1997.
German Search Report for DE-102022200201.6, dated Aug. 31, 2022.
Chinese Search Report, CN202310036871.8, dated May 7, 2025 (w_translation).
Chinese Office Action, CN202310036871.8, dated May 10, 2025 (w_translation).

* cited by examiner

FILTER DEVICE OF A MOTOR VEHICLE AND METHOD FOR OPERATING SAME

CROSS-REFERENCE TO RELATED APPLICATIONS

This application claims priority to German Patent Application No. DE 10 2022 200 201.6, filed on Jan. 11, 2022, the contents of which is hereby incorporated by reference in its entirety.

TECHNICAL FIELD

The invention relates to a filter device of a motor vehicle. The invention relates furthermore to a method for operating same.

BACKGROUND

Filter devices serve to filter air and to supply this downstream with for example predetermined air quality on the user side in an exhaust air stream of the filter device. Established filter devices offer relatively few possibilities in order to act internally on an air stream of air flowing through these, so that from this perspective they are, rather, inflexible. This can have the result that for example requirements on the user side with regard to the air quality of the exhaust air stream can only be fulfilled insufficiently.

SUMMARY

The problem of the invention lies in providing or indicating an improved or at least a different embodiment for a filter device of a motor vehicle. Furthermore, the problem can also lie in proposing a method for operating such a filter device.

In the present invention, this problem is solved in particular by the subjects of the independent claim(s). Advantageous embodiments are the subject matter of the dependent claim(s) and the description.

The basic idea of the invention lies in configuring in a flexible manner a filter device of a motor vehicle by means of several adjustable air flaps, with regard to the possibilities of being able to act internally on through-flowing air streams.

For this, a filter device of a motor vehicle is provided, in particular a filter device of an air-conditioning system of a motor vehicle, which is equipped with a step filter of individual filter elements arranged fluidically in series with respect to one another for the stepwise filtering of air. Two separate flow paths for air streams of air extend through the step filter, wherein the one, first flow path of these two flow paths runs through at least two individual filter elements of these individual filter elements, so that these are able to be flowed through by air. On the other hand, a further, second flow path of these two flow paths runs through a number of individual filter elements which is reduced by at least one single individual filter element compared to the number of individual filter elements run through by the first flow path, so that this reduced number of individual filter elements is also able to be flowed through by air. Expediently, the second flow path thus always runs through an individual filter element less than the first flow path. In other words, the flow paths can therefore be realised by different stages of the step filter. With respect to the air streams of air upstream or downstream of the step filter, the filter device has, furthermore, air flaps arranged in the filter device which are adjustable in particular in a rotatory or translatory manner, by means of which a first air stream of air of these said air streams and/or a second air stream of air of these said air streams is guided through or able to be guided through the step filter either along the first flow path or along the second flow path.

Through the in particular at least partial, fluidic series connection of the individual filter elements of the step filter it is achieved that air can flow along the said first flow path through the step filter and, in so doing, can always pass a greater number of individual filter elements than air which flows along the second flow path through the step filter. Thereby, the step filter can offer along the first flow path a type of fine filter stage or intensive filter stage for air, and along the second flow path a coarse filter stage, or at least a reduced filter stage compared to the fine filter stage in its filtering performance for air, wherein the fine filter stage realizes a more intensive cleaning (fine filtering) of the air flowing through there than the coarse filter stage (course filtering) in the case of the air there. The air stream guidance of the two air streams by means of the said air flaps offers the possibility of sending the one and/or the other air stream of these two air streams either through the fine filter stage of the step filter or through the coarse filter stage of the step filter, so that optionally the fine filter stage or the coarse filter stage is charged with air. Overall, this has the advantage that requirements for the air quality on the user side can be realized in a flexible manner.

The term "air quality" designates here expediently a difference, able to be detected metrologically or at least able to be established by sensory perception, between predetermined ideal air quality values of a reference ideal air, able to be verified metrologically, and air quality values able to be measured in actuality of a through-flowing air in particular within the filter device.

It is expedient if the first air stream is formed from fresh air which flows through a fresh air inlet of the filter device into the latter, and the second air stream is formed of circulating air which flows through a circulating air inlet of the filter device into the latter. Thereby, the filter device can be flushed through optionally by fresh air or circulating air, so that it is consequently able to be operated either in circulating air operation or in fresh air operation. It can be imagined that the said fresh air is taken for example from an environment of a motor vehicle and/or that the circulating air is taken from a cabin of a motor vehicle. The adjustable air flaps and the step filter create here the advantageous possibility that a reaction can be carried out in a flexible manner to possible air quality differences between fresh air and/or circulating air by fresh air, in fresh air operation, being guided through the step filter either along the first or the second flow path, or by circulating air, in circulating air operation, being guided through the step filter either along the first or the second flow path. As a result, a current or a predetermined air quality can thus be maintained practically unchanged or produced rapidly if changeover is carried out back and forth between circulating air operation and fresh air operation.

Furthermore it can be expedient if the filter device has at least one air quality sensor for detecting air quality values of air flowing through the filter device. It can at least be imagined that this concerns here one or more $CO_2$ air quality sensors or one or more particulate matter air quality sensors. This has the advantageous effect that air quality values of the air flowing through the filter device can be detected metrologically. Expediently, the at least one air quality sensor concerns an internal air quality sensor which is arranged directly in the one and/or in the other air stream of air, so that air quality values of the through-flowing air can be detected directly. Advantageously for example an arrangement of the air quality sensor can be upstream and/or downstream of the step filter. This has the advantage that changes of air quality values of the air are detected rapidly and a reaction can be carried out accordingly.

It is furthermore expedient if the first flow path extends through precisely two or more individual filter elements, and the second flow path extends through precisely one single individual filter element. Through an increase in the number of individual filter elements run through by the first flow path and/or by the second flow path, i.e. in particular through an increase in the number of individual filter elements flushed through by air, basically an improved cleaning or respectively filtering of the air flowing through the step filter can be achieved. Through the (minimum) number of individual filter elements indicated above for the first and second flow path, an advantageous, preferred configuration of the filter device is indicated, in which a corresponding filter device is able to be realized in a relatively economical, compact and light-weight manner.

It is to be mentioned that each of the said individual filter elements can be produced by a, for example pleated, filter material and can expediently be embodied in a cuboid shape. Thereby, by means of the individual filter elements a sufficient filtering of the air can be ensured and/or a relatively easy installation or respectively an easy and swift filter change of the individual filter elements can be realized.

It is furthermore expedient if the filter device has three separately adjustable air flaps. Thereby, air streams of air flowing through the filter device can be guided in a relatively flexible manner. It is conceivable that depending on flow conditions which are to be encountered in actuality in a filter device, more or fewer air flaps and/or additionally rigid air conducting elements come into use for the guiding of air. For adjusting the air flaps for example electromotive actuators can be used.

When the filter device has three air flaps, it is expedient if one air flap of these three air flaps is separately adjustable, and the other two air flaps of these air flaps are coupled to one another mechanically by a coupling member and are jointly adjustable. Thereby also, air streams of air flowing through the filter device can be guided in a relatively flexible manner. However, the number of actuators required for adjusting the air flaps can be reduced, so that a filter device is able to be realized in a relatively economical and light-weight manner.

It is furthermore expedient if the said three air flaps are realized by a fresh air flap, a bypass air flap and a circulating air flap. Here, provision can be made that the fresh air flap is adjustable between a first closed position, blocking a fresh air inlet of the filter device, a second closed position, by which the first flow path for the first air stream of fresh air, onflowing from a fresh air inlet of the filter device and for the second air stream of circulating air onflowing from a circulating air inlet of the filter device is blocked, and several open positions by which respectively the first air stream of fresh air onflowing from the fresh air inlet and the second air stream of circulating air onflowing from the circulating air inlet along the first flow path are unblocked. Furthermore, provision can be made that the bypass air flap is adjustable between a first closed position, by which the second flow path for the first air stream of fresh air onflowing from the fresh air inlet and for the second air stream of circulating air onflowing from the circulating air inlet is blocked, however the first flow path for the first air stream of fresh air for the first air stream onflowing from the fresh air inlet and/or for the second air stream of circulating air onflowing from the circulating air inlet is unblocked, and a second closed position, by which the second flow path for the first air stream of fresh air onflowing from the fresh air inlet is blocked and for the second air stream of circulating air onflowing from the circulating air inlet is unblocked, and by which the first flow path for the second air stream of circulating air onflowing from the circulating air inlet is blocked, and several open positions, by which respectively the first air stream of fresh air, onflowing from the fresh air inlet along the second flow path, and the second air stream of circulating air onflowing from the circulating air inlet along the first flow path are unblocked. The said circulating air flap can be adjustable between a closed position by which the second air stream of circulating air onflowing from the circulating air inlet is blocked, and several open positions, by which respectively the second air stream of circulating air onflowing from the circulating air inlet along the first flow path or the second flow path is unblocked. Thereby, a configuration of the filter device is indicated, in which the air streams of circulating air and fresh air are realized and the air flaps are realized by three air flaps adjustable back and forth between closed positions and open positions. Thereby, a relatively flexible guiding of the air streams in the interior of the filter device can be brought about.

Another basic idea of the invention, which is able to be realized additionally or alternatively to the basic idea mentioned further above, can lie in indicating a method for operating a filter device according to the preceding description. The proposed method is characterized by operating modes A) to D), to be carried out optionally, with steps to be carried out respectively sequentially or in any desired sequence:

A) Operating the filter device in a fresh air operation with coarse filtering, by the steps:

1) Providing a first air stream of fresh air onflowing from a fresh air inlet of the filter device,
2) Adjusting a fresh air flap of the air flaps into its second closed position, by which the first flow path for the first air stream of fresh air onflowing from the fresh air inlet is blocked,
3) Adjusting a bypass air flap of the air flaps into one of its open positions, by which the first air stream of fresh air, onflowing from the fresh air inlet along the second flow path is unblocked,
4) Adjusting a circulating air flap of the air flaps into its closed position, by which a second air stream of circulating air onflowing from a circulating air inlet of the filter device is blocked, so that as a whole the second air stream of circulating air onflowing from the circulating air inlet is completely blocked by the circulating air flap, the first flow path for the first air stream of fresh air onflowing from the fresh air inlet is completely blocked by the fresh air flap, and the second flow path for the first air stream of fresh air onflowing from the fresh air inlet past the fresh air flap and the bypass air flap is unblocked, so that the first air stream of fresh air flows through the step filter along the second flow path, and/or B) Operating the filter device in a fresh air operation with fine filtering, by the steps:

1) Providing a first air stream of fresh air onflowing from a fresh air inlet of the filter device,
2) Adjusting a fresh air flap of the air flaps into one of its open positions, by which the first air stream of fresh air onflowing from the fresh air inlet is unblocked, 3) Adjusting a bypass air flap of the air flaps into its second closed position, by which the second flow path for the first air stream of fresh air onflowing from the fresh air inlet is blocked, 4) Adjusting a circulating air flap of the air flaps into its closed position, by which a second air stream of circulating air onflowing from a circulating air inlet of the filter device is blocked, so that as a whole the second air stream of circulating air onflowing optionally from the circulating air inlet is completely blocked by the circulating air flap, the second flow path for the first air stream of fresh air onflowing from the fresh air inlet is blocked by the bypass air flap, and the first flow path for the first air stream of fresh air onflowing from the fresh air inlet past the fresh air flap is unblocked, so that the first air stream of fresh air flows along the first flow path through the step filter, and/or C) Operating the filter device in a circulating air operation with coarse filtering, by the steps:

1) Providing a second air stream of circulating air onflowing from a circulating air inlet of the filter device, 2) Adjusting a fresh air flap of the air flaps into its first closed position blocking a fresh air inlet of the filter device, 3) Adjusting a bypass air flap of the air flaps into its second closed position, by which the first flow path for the second air stream of circulating air onflowing from the circulating air inlet is blocked, however the second flow path for the second air stream of circulating air onflowing from the circulating air inlet is unblocked, 4) Adjusting a circulating air flap of the air flaps into one of its open positions, by which respectively the second air stream of circulating air onflowing from the circulating air inlet along the second flow path is unblocked, so that as a whole the first air stream of fresh air onflowing optionally from a fresh air inlet of the filter device is completely blocked, the first flow path for the second air stream of circulating air onflowing from the circulating air inlet is completely blocked by the bypass air flap, and the second flow path for the second air stream of circulating air onflowing from the circulating air inlet past the circulating air flap and the bypass air flap is unblocked, so that the second air stream of circulating air flows through the step filter along the second flow path, and/or D) Operating the filter device in a circulating air operation with fine filtering, by the steps:

1) Providing a second air stream of circulating air onflowing from a circulating air inlet of the filter device, 2) Adjusting a fresh air flap of the air flaps into its first closed position blocking a fresh air inlet of the filter device, 3) Adjusting a bypass air flap of the air flaps into its first closed position, by which the second flow path for the second air stream of circulating air onflowing from the circulating air inlet is blocked, however the first flow path for the second air stream of circulating air onflowing from the circulating air inlet is unblocked, 4) Adjusting a circulating air flap of the air flaps into one of its open positions, by which respectively the second air stream of circulating air, onflowing from the circulating air inlet along the first flow path is unblocked, so that as a whole a first air stream of fresh air onflowing optionally from a fresh air inlet of the filter device is completely blocked, the second flow path for the second air stream of circulating air onflowing from the circulating air inlet is completely blocked by the bypass flap, and the first flow path for the second air stream of circulating air onflowing from the circulating air inlet past the circulating air flap, the bypass air flap and the fresh air flap is unblocked, so that the second air stream of circulating air flows through the step filter along the first flow path.

Thereby as a whole an advantageous method for operating a filter device is indicated, wherein the latter is able to be operated within the method optionally either in a fresh air operation, cf. operating modes A) and B), and a circulating air opergion, cf. operating modes C) and D). According to method, provision is made furthermore that in turn in the fresh air operation and in the circulating air operation a selection can be made between a fine filter operation and a coarse filter operation. Thereby, it is possible to provide on the user side an exhaust air stream provided either from fresh air or from circulating air in an intensively filtered a less intensively filtered manner.

In summary, it remains to be noted: The present invention preferably concerns a filter device with a step filter of individual filter elements arranged fluidically in series, through which two flow paths extend for air streams of air, wherein a first flow path runs through at least two individual filter elements of these individual filter elements, so that these are able to be flowed through by air, wherein a second flow path runs through a single individual filter element, so that the latter is able to be flowed through by air, with air flaps arranged upstream or downstream of the step filter, by means of which a first air stream of air of these air streams and/or a second air stream of air of these air streams is guided along the first flow path or along the second flow path through the step filter. The invention further relates expediently to a method for operating such a filter device.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

BRIEF DESCRIPTION OF THE DRAWINGS

There are shown, respectively schematically

DETAILED DESCRIPTION

FIGS. 1 to 5 show a preferred example embodiment of a filter device, designated as a whole by the reference number 1, serving for the filtering of air, of a motor vehicle which is not drawn here. By way of example, the filter device 1 can be integrated for example in an air-conditioning system of the motor vehicle or can be retrofitted there.

Figure 1:
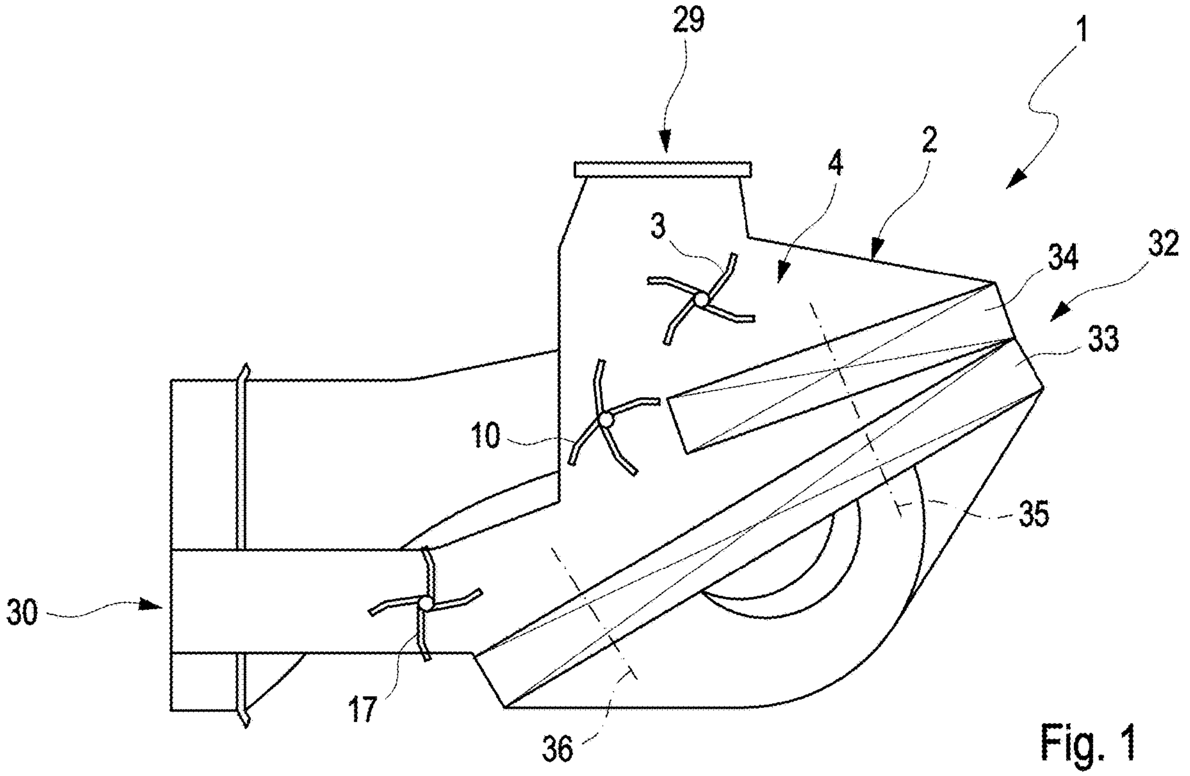
FIG. 1 shows a sectional view of a filter device according to the invention according to a preferred example embodiment.

With reference to FIG. 1, it is to be noted that the filter device 1 has a housing 2 delimiting an installation space 4. The housing 2 has two separate inlets for air, spaced apart from one another and opening into the installation space 4, wherein the one, upwardly open, inlet is used for the inflowing of fresh air, so that it is designated here as fresh air inlet 29 of the filter device 1, whereas the other inlet, open towards the side, is used for the inflowing of circulating air and is therefore entitled as circulating air inlet 30 of the filter device 1. In operation of the filter device 1, thereby basically from the fresh air inlet 29 a first air stream 37 of fresh air, cf. FIGS. 2 and 3, and from the circulating air inlet 30 a second air stream 38 of circulating air, cf. FIGS. 4 and 5, can flow into the filter device 1. Provision is made here that the filter device 1 is able to be operated optionally in a circulating air operation or in a fresh air operation, so that consequently either the first air stream 37 of fresh air, cf. FIGS. 2 and 3, or the second air stream 38 of circulating air, cf. FIGS. 4 and 5, flow into the filter device 1.

The filter device 1 in FIGS. 1 to 5 has, furthermore, a multi-stage step filter 32 fixed on the housing 2 from the interior in the installation space 4, which step filter is assembled here from two individual filter elements 33, 34, arranged fluidically in series with respect to one another, for the stepwise filtering of air. By way of example, two separate flow paths 35, 36 for the air streams 37, 38 of air extend through the step filter 32, wherein a first flow path 35 of these two flow paths 35, 36, which is indicated by a dot-and-dash line respectively in FIGS. 1 to 4, as can be seen runs through both individual filter elements 33, 34, so that these are able to be flowed through by air. The other, second, flow path 36 of these two flow paths 35, 36, which is indicated in FIGS. 1 to 4 respectively by a double-dot and-dash line, extends on the other hand only through a single individual filter element 33, so that the number of individual filter elements 33, 34 through which the second flow path 36 extends is reduced compared to the first flow path 35. The step filter 32 can therefore realize along the first flow path 35 a type of fine filter stage or intensive filter stage for air, and along the second flow path 36 a coarse filter stage for air, wherein the fine filter stage realizes a more intensive cleaning (fine filtering) of the air flowing through there, than the coarse filter stage (coarse filtering) with the air flowing through there.

The filter device 1 has, furthermore, three air flaps 3, 10, 17 which are arranged upstream (or if applicable downstream) of the step filter 32 in the installation space 4 of the filter device 1 and are adjustable, by means of which the first air stream 37 of fresh air of the said air streams 37, 38 and/or the second air stream 38 of circulating air of the said air stream 37, 38 can be guided along the first flow path 35 or alternatively along the second flow path 36 through the step filter 32. The adjustable air flaps 3, 10, 17 can thus realize an air stream guidance by which the filter device 1 can firstly be operated optionally in a fresh air operation or in a circulating air operation. Moreover, the air flaps 3, 10, 17 offer the option, within the respective type of operation, to additionally also switch back and forth between a fine filtering of the through-flowing air or a coarse filtering of the through-flowing air. As a whole, this has the advantage that requirements on the user side regarding the air quality can be realized in a flexible manner.

Purely by way of example, the said air flaps 3, 10, 17 are realized by a fresh air flap 3, a bypass air flap 10 and a circulating air flap 17. This can concern rotatably adjustable flaps here or else also sliders which are adjustable in a translatory manner.

In FIGS. 2 to 5, a method is illustrated for operating the filter device 1 of FIG. 1. The method is distinguished by four different operating modes A) to D), which respectively comprise steps which are to be carried out sequentially or in any desired sequence, which are described below with reference to FIGS. 2 to 4.

Figure 2:
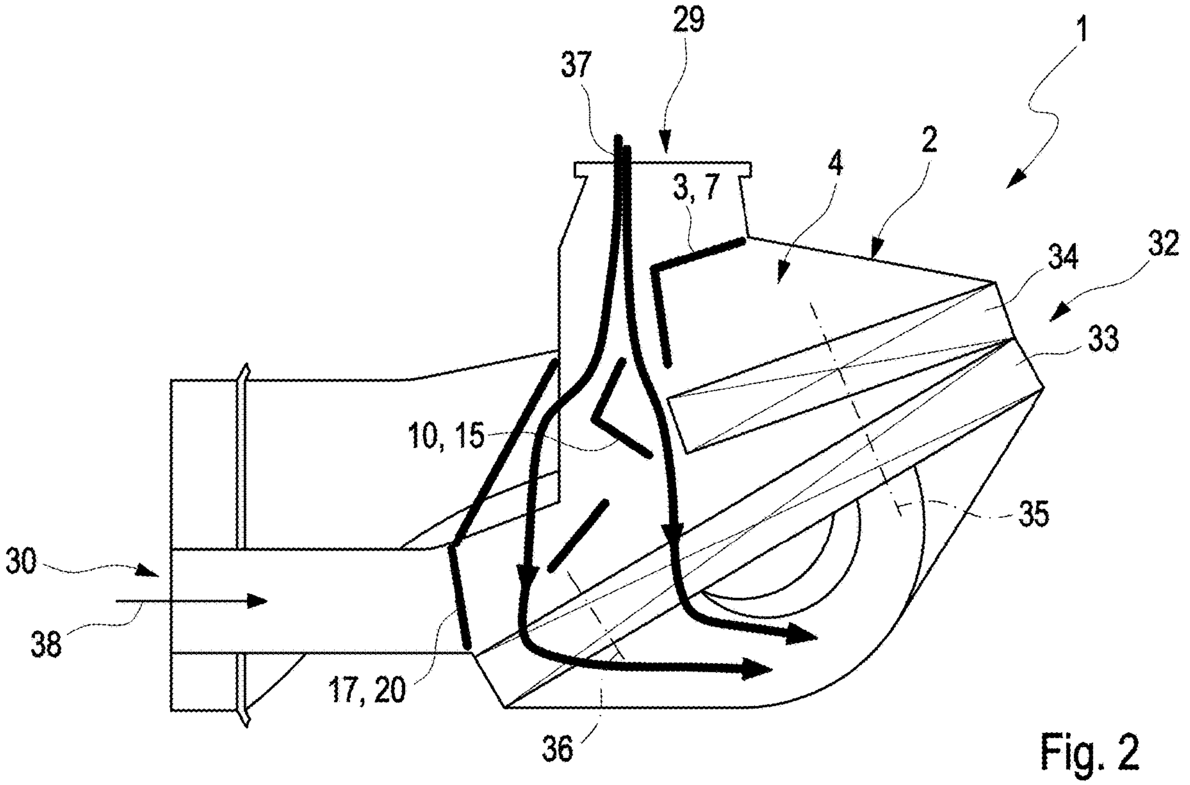
FIG. 2 shows the sectional view of the filter device of FIG. 1, wherein the filter device is operated in a fresh air operation with coarse filtering of the through-flowing fresh air.

In FIG. 2 the operating mode A of the said method is illustrated, in which the filter device 1 is operated in a fresh air operation with coarse filtering. For this, firstly a first air stream 37 of fresh air, onflowing from the fresh air inlet 29, is provided and the air flaps 3, 10, 17 are adjusted as follows: The fresh air flap 3 is adjusted into a second, closed, position 7, by which the first flow path 35 for the first air stream 37 of fresh air, onflowing from the fresh air inlet 29, is blocked. The bypass air flap 10 is adjusted into one of several conceivable open positions 15, by which the first air stream 37 of fresh air, onflowing from the fresh air inlet 29 along the second flow path 36 is unblocked. The circulating air flap 17 is adjusted into a closed position 20, by which a second air stream 38 of circulating air onflowing optionally from the circulating air inlet 30 is completely blocked. Thereby, in operating mode A of the said method it can be achieved as a whole that the second air stream 38 of circulating air onflowing optionally from the circulating air inlet 30 is completely blocked by the circulating air flap 17, the first flow path 35 for the first air stream 37 of fresh air onflowing from the fresh air inlet 29 is completely blocked by the fresh air flap 3, and the second flow path 36 for the first air stream 37 of fresh air onflowing from the fresh air inlet 29 past the fresh air flap 3 and the bypass air flap 10 is unblocked. This has the effect that the first air stream 37 of fresh air flows through the step filter 32 along the second flow path 36, wherein or whereby the said coarse filtering in the fresh air operation is realized.

Figure 3:
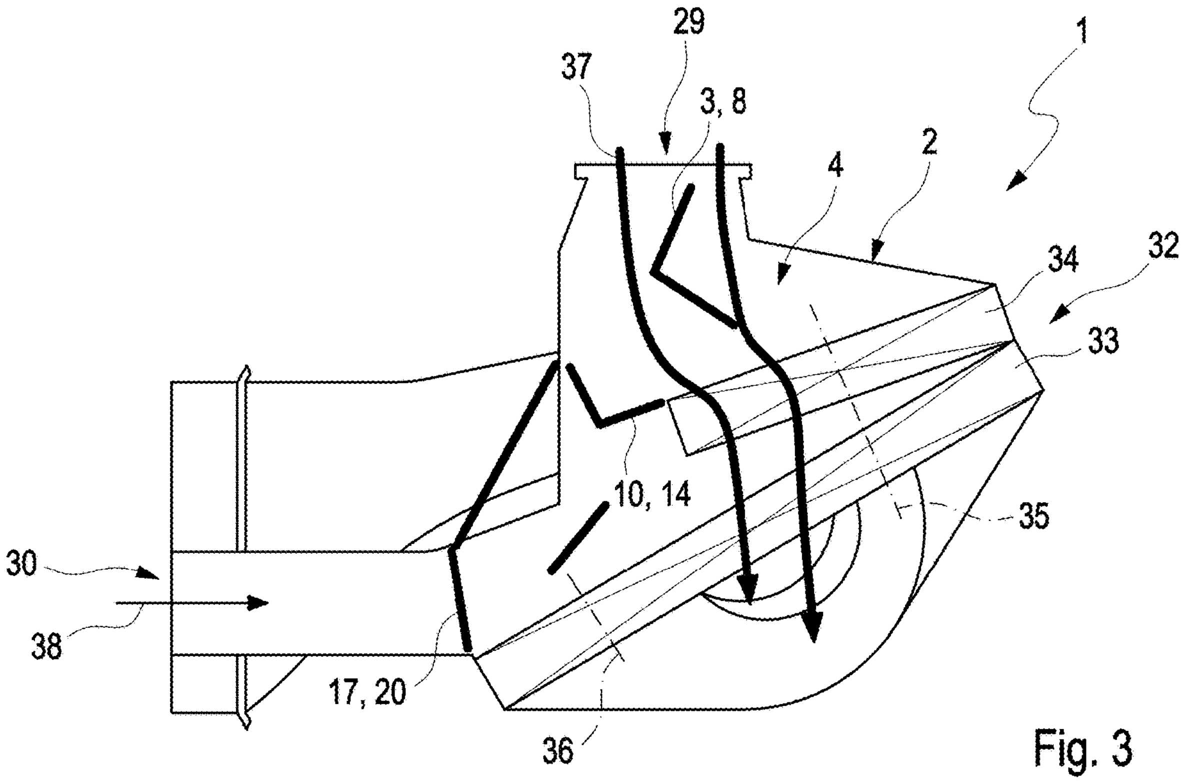
FIG. 3 shows the sectional view of the filter device of FIG. 1, wherein the filter device is operated in a fresh air operation with fine filtering of the through-flowing fresh air.

In FIG. 3 the operating mode B of the said method is illustrated, in which the filter device 1 is operated in a fresh air operation with fine filtering. For this, firstly again a first air stream 37 of fresh air is provided, onflowing from the fresh air inlet 29 of the filter device 1, and the air flaps 3, 10, 17 are adjusted as follows: The fresh air flap 3 is adjusted into one of its open positions 8, by which the first air stream 37 of fresh air onflowing from the fresh air inlet 29, is unblocked. The bypass air flap 10 is adjusted into a second closed position 14, by which the second flow path 36 for the first air stream 37 of fresh air onflowing from the fresh air inlet 29 is blocked. Furthermore, the circulating air flap 17 is adjusted into the said closed position 20, by which a second air stream 38 of circulating air onflowing optionally from the circulating air inlet 30 of the filter device 1 is blocked. Thereby, in the operating mode B of the said method it can be achieved as a whole that firstly the second air stream 38 of circulating air, optionally onflowing from the circulating air inlet 30 is completely blocked by the circulating air flap 17, the second flow path 36 for the first air stream 37 of fresh air, onflowing from the fresh air inlet 29 is blocked by the bypass air flap 10, and the first flow path 35 for the first air stream 37 of fresh air onflowing from the fresh air inlet 29 past the fresh air flap 3 is unblocked. Thereby, the first air stream 37 of fresh air can flow along the first flow path 35 through the step filter 32, whereby the said fine filtering is realized in fresh air operation.

Figure 4:
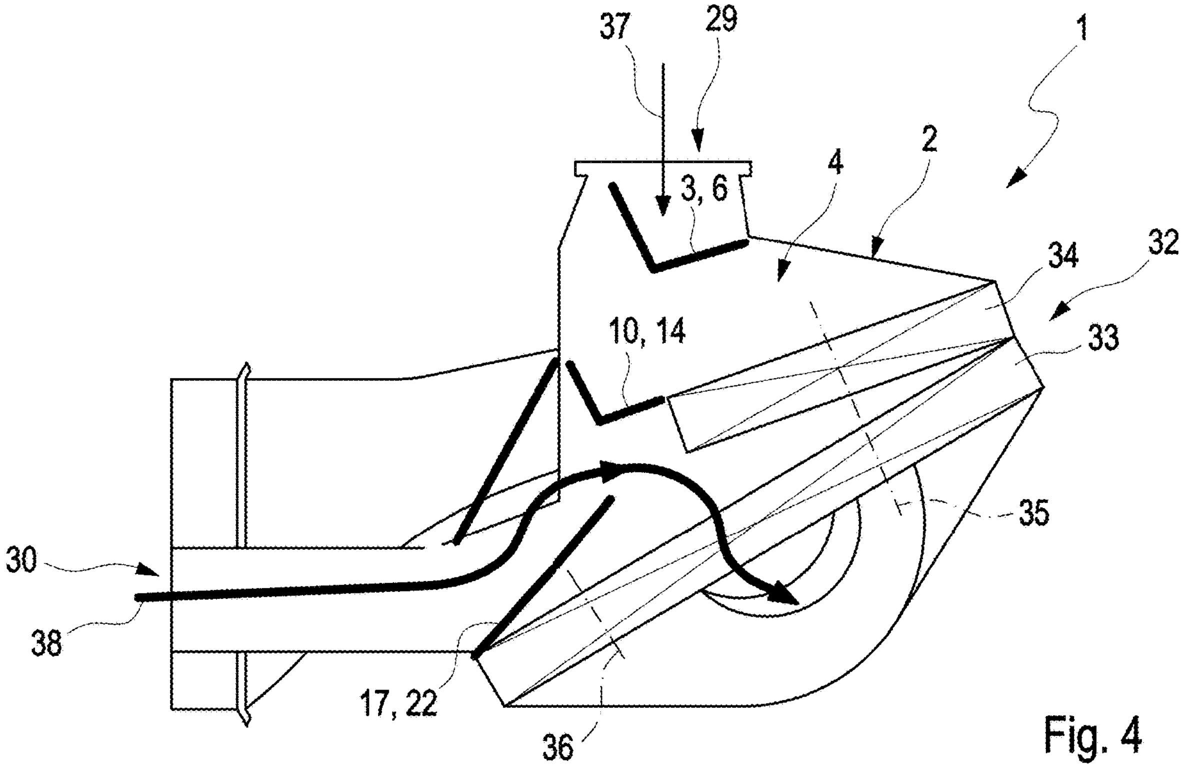
FIG. 4 shows the sectional view of the filter device of FIG. 1, wherein the filter device is now operated in a circulating air operation with coarse filtering of the through-flowing circulating air, and lastly in FIG. 5 shows the sectional view of the filter device of FIG. 1, wherein the filter device is operated in a circulating air operation with fine filtering of the through-flowing circulating air.

In FIG. 4 the operating mode C of the said method is illustrated, in which the filter device 1 is operated in a circulating air operation with coarse filtering. For this, firstly a second air stream 38 of circulating air is provided, which is onflowing from the circulating air inlet 30 of the filter device 1, and adjusts the air flaps 3, 10, 17 as follows: The fresh air flap 3 is adjusted into a first, closed position 6, in which the fresh air inlet 29 of the filter device 1 is completely blocked, so that an optional first air stream 27 of fresh air is blocked. Furthermore, the bypass air flap 10 is adjusted into the said second closed position 14, whereby the first flow path 35 for the second air stream 38 of circulating air onflowing form the circulating air inlet 30 is blocked, however the second flow path 36 for the second air stream 38 of circulating air onflowing from the circulating air inlet 30 is unblocked. Furthermore, the circulating air flap 17 is adjusted into one of its open positions 22, by which respectively the second air stream 38 of circulating air onflowing from the circulating air inlet 30 along the second flow path 36 is unblocked. Thereby, in the operating mode C of the said method it can be achieved as a whole that firstly the first air stream 37 of fresh air onflowing optionally from the fresh air inlet 29 of the filter device 1 is completely blocked, the first flow path 35 for the second air stream 38 of circulating air onflowing from the circulating air inlet 30 is completely blocked by the bypass air flap 10, and the second flow path 36 for the second air stream 38 of circulating air onflowing from the circulating air inlet 30 past the circulating air flap 17 and the bypass air flap 10 is unblocked. Thereby, the second air stream 38 of circulating air can flow through the step filter 32 along the second flow path 36, whereby the said coarse filtering in circulating operation is realized.

Figure 5:
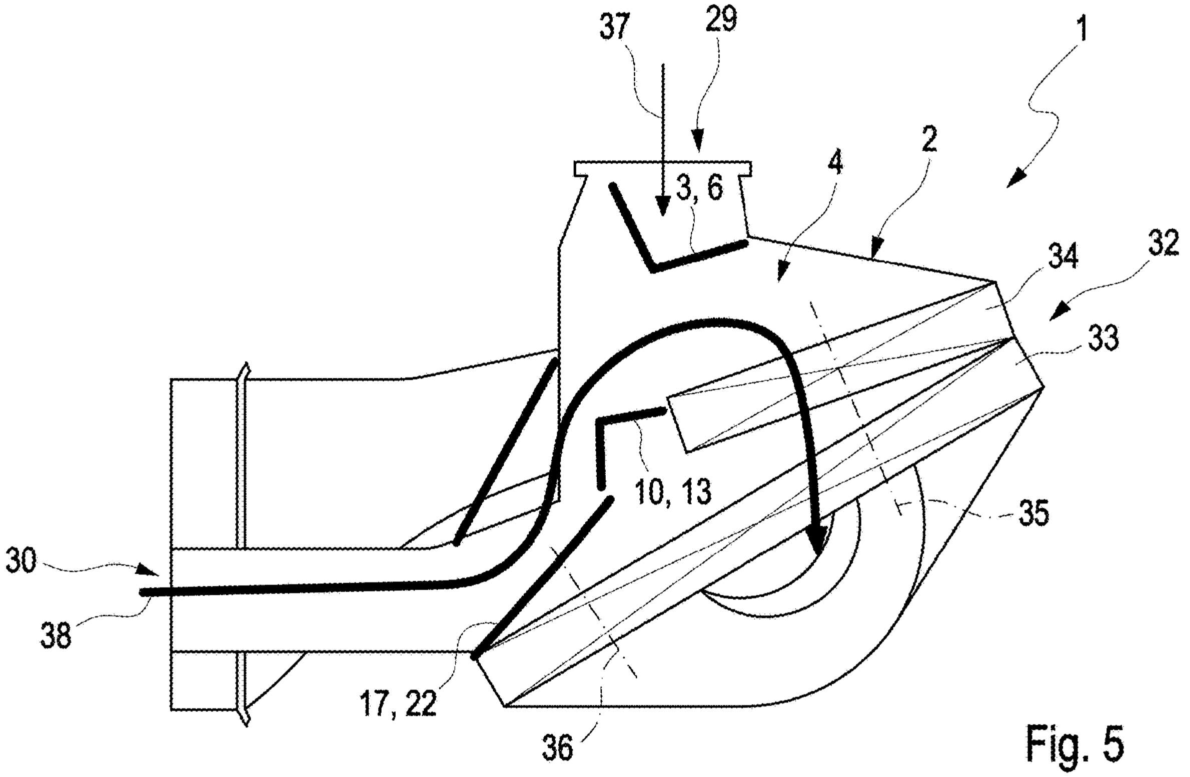

Lastly, the operating mode D of the said method is illustrated in FIG. 5, in which the filter device 1 is operated in a circulating air operation with fine filtering. For this, firstly again a second air stream 38 of circulating air onflowing from the circulating air inlet 30 of the filter device 1 is provided, and then the air flaps 3, 10, 17 are adjusted as follows: The fresh air flap 3 is adjusted into the said first closed position 6, in which the fresh air inlet 29 of the filter device 1 is blocked for the first air stream 37 of fresh air. Then the bypass air valve 10 is adjusted into a first closed position 13, whereby the second flow path 36 is blocked for the second air stream 38 of circulating air onflowing from the circulating air inlet 30, however the first flow path 35 for the second air stream 38 of circulating air onflowing from the circulating air inlet 30 is unblocked. Furthermore, the circulating air flap 17 is adjusted into the said one open position 22, by which then the second air stream 38 of circulating air onflowing from the circulating air inlet 30 along the first flow path 35 is unblocked. Thereby, in the operating mode D of the said method it can be achieved as a whole that firstly a first air stream 37 of fresh air onflowing optionally from the fresh air inlet 29 is completely blocked, the second flow path 36 for the second air stream 38 of circulating air onflowing from the circulating air inlet 30 is completely blocked by the bypass air flap 10, and the first flow path 35 for the second air stream 38 of circulating air onflowing from the circulating air inlet 30 past the circulating air flap 17, the bypass air flap 10 and the fresh air flap 3 is unblocked. This has the advantage that the second air stream 38 of circulating air flows through the step filter 32 along the first flow path 35, whereby the said fine filtering is realized in circulating air operation.

The invention claimed is:

1. A filter device of a motor vehicle, comprising:
- a step filter including a plurality of individual filter elements arranged fluidically in series with respect to one another for a stepwise filtering of air;
- two flow paths for a plurality of air streams of air, the two flow paths extending through the step filter;
- a first flow path of the two flow paths extending through at least two individual filter elements of the plurality of individual filter elements such that air is flowable through the at least two individual filter elements;
- a second flow path of the two flow paths extending through a number of the plurality of individual filter elements which, compared to a number of the plurality of individual filter elements through which the first flow path extends, is reduced by at least one single individual filter element, such that air is flowable through the number of the plurality of individual filter elements through which the second flow path extends;
- a plurality of adjustable air flaps arranged at least one of upstream and downstream of the step filter via which at least one of a first air stream of air of the plurality of air streams and a second air stream of air of the plurality of air streams is guidable through the step filter along at least one of the first flow path and the second flow path.

2. The filter device according to claim 1, further comprising a fresh air inlet and a circulating air inlet, wherein:
- the first air stream is formed of fresh air which flows through the fresh air inlet; and
- the second air stream is formed of circulating air which flows through the circulating air inlet.

3. The filter device according to claim 1, further comprising at least one air quality sensor structured and arranged to detect air quality values of air flowing through the filter device.

4. The filter device according to claim 1, wherein the second flow path extends through precisely one single individual filter element of the plurality of individual filter elements.

5. The filter device according to claim 1, wherein the plurality of adjustable air flaps includes three, separately adjustable air flaps.

6. The filter device according to claim 1, wherein:
- the plurality of adjustable air flaps includes three air flaps;
- one air flap of the three air flaps is separately adjustable; and
- the other two air flaps of the three air flaps are jointly adjustable by a coupling member.

7. The filter device according to claim 1, wherein the plurality of adjustable air flaps includes a fresh air flap, a bypass air flap, and a circulating air flap.

8. The filter device according to claim 7, further comprising a fresh air inlet and a circulating air inlet, wherein:
- the first air stream is formed of fresh air which flows through the fresh air inlet;
- the second air stream is formed of circulating air which flows through the circulating air inlet;
- the fresh air flap is adjustable to:
  - a first closed position in which the fresh air flap blocks the fresh air inlet;

a second closed position in which the fresh air flap blocks the first air stream and the second air stream from flowing along the first flow path; and a plurality of open positions in which the first air stream and the second air stream are not blocked from flowing along the first flow path by the fresh air flap;

the bypass air flap is adjustable to:

a first closed position in which (i) the bypass air flap at least partially blocks the first air stream and the second air stream from flowing along the second flow path and (ii) at least one of the first air stream and the second air stream is not blocked from flowing along the first flow path by the bypass air flap;

a second closed position in which (i) the bypass air flap blocks the first air stream from flowing along the second flow path, (ii) the bypass air flap does not block the second air stream from flowing along the second flow path, and (iii) the bypass air flap blocks the second air stream from flowing along the first flow path; and a plurality of open positions in which the bypass air flap does not block (i) the first air stream from flowing along the second flow path and (ii) the second air stream from flowing along the first flow path; and the circulating air flap is adjustable to:

a closed position in which the circulating air flap blocks the circulating air inlet; and a plurality of open positions in which the circulating air flap does not block the second air stream from flowing along the first flow path and the second flow path.

9. The filter device according to claim 8, further comprising a housing in which the step filter, the first flow path, the second flow path, and the plurality of adjustable air flaps are arranged, wherein:

when the fresh air flap is disposed in the second closed position, the fresh air flap blocks an opening defined between the housing and an upstream filter element of the at least two individual filter elements; and when the fresh air flap is disposed in the plurality of open positions, the fresh air flap does not block the opening.

10. The filter device according to claim 8, further comprising a housing in which the step filter, the first flow path, the second flow path, and the plurality of adjustable air flaps are arranged, wherein:

when the bypass air flap is disposed in the first closed position, the bypass air flap (i) does not block a first opening defined between the housing and an upstream filter element of the at least two individual filter elements and (ii) blocks a second opening defined between a guide body of the housing and the upstream filter element;

when the bypass air flap is disposed in the second closed position, the bypass air flap (i) blocks the first opening and (ii) does not block the second opening; and when the bypass air flap is disposed in the plurality of open positions, the bypass air flap (i) does not block the first opening and (ii) does not block the second opening.

11. The filter device according to claim 8, further comprising a housing in which the step filter, the first flow path, the second flow path, and the plurality of adjustable air flaps are arranged, wherein:

when the circulating air flap is disposed in at least one of the plurality of open positions, the circulating air flap blocks an opening defined between at least one wall of the housing and a guide body of the housing; and when the circulating air flap is disposed in the closed position, the circulating air flap does not block the opening.

12. The filter device according to claim 1, further comprising a housing in which the step filter, the first flow path, the second flow path, and the plurality of adjustable air flaps are arranged, wherein:

the at least two individual filter elements through which the first flow path extends includes an upstream filter element and a downstream filter element;

the housing includes a guide body disposed between two air flaps of the plurality of adjustable air flaps;

a first opening is defined between the housing and the upstream filter element;

a second opening is defined between the housing and the upstream filter element;

a third opening is defined between the guide body and the upstream filter element; and a fourth opening is defined between the guide body and at least one wall of the housing.

13. The filter device according to claim 12, wherein the plurality of adjustable air flaps includes:

a fresh air flap adjustable to selectively block the first opening and a fresh air inlet of the housing;

a bypass air flap adjustable to selectively block the second opening and the third opening; and a circulating air flap adjustable to selectively block the fourth opening and a circulating air inlet of the housing.

14. The filter device according to claim 13, wherein the fresh air flap is adjustable to:

a first closed position in which the fresh air flap (i) blocks the fresh air inlet and (ii) does not block the first opening;

a second closed position in which the fresh air flap (i) does not block the fresh air inlet and (ii) blocks the first opening; and an open position in which the fresh air inlet and the first opening are unblocked by the fresh air flap.

15. The filter device according to claim 13, wherein the bypass air flap is adjustable to:

a first closed position in which the bypass air flap (i) does not block the second opening and (ii) blocks the third opening;

a second closed position in which the bypass air flap (i) blocks the second opening and (ii) does not block the third opening; and an open position in which the second opening and the third opening are unblocked by the bypass air flap.

16. The filter device according to claim 13, wherein the circulating air flap is adjustable to:

a closed position in which the circulating air flap (i) blocks the circulating air inlet and (ii) does not block the fourth opening; and an open position in which the circulating air flap (i) does not block the circulating air inlet and (ii) blocks the fourth opening.

17. The filter device according to claim 13, wherein:

the first air stream is a fresh air stream flowable through the fresh air inlet;

the second air stream is a circulating air stream flowable through the circulating air inlet;

the fresh air flap is adjustable to:

a first closed position in which the fresh air flap (i) blocks the fresh air inlet and (ii) does not block the first opening;

a second closed position in which the fresh air flap (i) does not block the fresh air inlet and (ii) blocks the first opening; and an open position in which the fresh air inlet and the first opening are unblocked by the fresh air flap the bypass air flap is adjustable to:

a first closed position in which the bypass air flap (i) does not block the second opening and (ii) blocks the third opening;

a second closed position in which the bypass air flap (i) blocks the second opening and (ii) does not block the third opening; and an open position in which the second opening and the third opening are unblocked by the bypass air flap;

the circulating air flap is adjustable to:

a closed position in which the circulating air flap (i) blocks the circulating air inlet and (ii) does not block the fourth opening; and an open position in which the circulating air flap (i) does not block the circulating air inlet and (ii) blocks the fourth opening;

in a first operating mode, the fresh air flap is disposed in the second closed position, the bypass air flap is disposed in the open position, and the circulating air flap is disposed in the closed position such that (i) the fresh air stream is flowable along the second flow path and is blocked from flowing along the first flow path and (ii) the circulating air stream is block from flowing through the step filter;

in a second operating mode, the fresh air flap is disposed in the open position, the bypass air flap is disposed in the second closed position, and the circulating air flap is disposed in the closed position such that (i) the fresh air stream is flowable along the first flow path and is blocked from flowing along the second flow path and (ii) the circulating air stream is block from flowing through the step filter;

in a third operating mode, the fresh air flap is disposed in the first closed position, the bypass air flap is disposed in the second closed position, and the circulating air flap is disposed in the open position such that (i) the fresh air stream is block from flowing through the step filter and (ii) the circulating air stream is flowable along the second flow path and is blocked from flowing along the first flow path; and in a fourth operating mode, the fresh air flap is disposed in the first closed position, the bypass air flap is disposed in the first closed position, and the circulating air flap is disposed in the open position such that (i) the fresh air stream is block from flowing through the step filter and (ii) the circulating air stream is flowable along the first flow path and is blocked from flowing along the second flow path.

18. A method for operating a filter device according to claim 1, comprising carrying out at least one of:

a fresh air operation with coarse filtering via:

providing the first air stream via flowing fresh air through a fresh air inlet of the filter device;

adjusting a fresh air flap of the plurality of adjustable air flaps into a closed position to block the first air stream from flowing along the first flow path;

adjusting a bypass air flap of the plurality of adjustable air flaps into an open position in which the bypass air flap does not block the first air stream from flowing along the second flow path;

adjusting a circulating air flap of the plurality of air flaps into a closed position to block a circulating air inlet of the filter device through which circulating air is flowable to provide the second air stream; and flowing the first air stream past the fresh air flap, past the bypass air flap, and through the step filter along the second flow path;

a fresh air operation with fine filtering via:

providing the first air stream via flowing fresh air through the fresh air inlet;

adjusting the fresh air flap into an open position in which the fresh air flap does not block the first air stream;

adjusting the bypass air flap into a closed position to block the first air stream from flowing along the second flow path;

adjusting the circulating air flap into the closed position to block the circulating air inlet; and flowing the first air stream past the fresh air flap and through the step filter along the first flow path;

a circulating air operation with coarse filtering via:

providing the second air stream via flowing circulating air through the circulating air inlet;

adjusting the fresh air flap into another closed position to block the fresh air inlet;

adjusting the bypass air flap into the closed position in which the bypass air flap (i) blocks the second air stream from flowing along the first flow path and (ii) does not block the second air stream from flowing along the second flow path;

adjusting the circulating air flap into an open position in which the circulating air flap does not block the second air stream from flowing along the second flow path; and flowing the second air stream past the circulating air flap, past the bypass air flap, and through the step filter along the second flow path; and a circulating air operation with fine filtering via:

providing the second air stream via flowing circulating air through the circulating air inlet;

adjusting the fresh air flap into the another closed position to block the fresh air inlet;

adjusting the bypass air flap into another closed position in which the bypass air flap (i) blocks the second air stream from flowing along the second flow path and (ii) does not block the second air stream from flowing along the first flow path;

adjusting the circulating air flap into the open position in which the circulating air flap does not block the second air stream from flowing along the first flow path; and flowing the second air stream past the circulating air flap, past the bypass air flap, past the fresh air flap, and through the step filter along the first flow path.

19. A filter device of a motor vehicle, comprising:

a housing;

a step filter arranged in the housing, the step filter including a plurality of individual filter elements arranged fluidically in series with respect to one another for a stepwise filtering of air;

a first flow path extending through a first subset of the plurality of individual filter elements;

a second flow path extending through a second subset of the plurality of individual filter elements;

a plurality of adjustable air flaps arranged in the housing via which at least one of a plurality of air streams is guidable through the step filter along at least one of the first flow path and the second flow path;

wherein the second subset of the plurality of individual filter elements is defined by a smaller number of the plurality of individual filter elements than the first subset of the plurality of individual filter elements; and wherein the plurality of adjustable air flaps are arranged upstream and/or downstream of the step filter.

20. The filter device according to claim 19, wherein:

the plurality of individual filter elements includes a first filter element and a second filter element;

the first filter element and the second filter element define the first subset of the plurality of individual filter elements; and the first filter element defines the second subset of the plurality of individual filter elements.

* * * * *